Dec. 24, 1940.  A. A. SCOTT  2,226,326
MOLDING MACHINE
Original Filed Oct. 29, 1936  5 Sheets-Sheet 1

Inventor
Alexander A. Scott
By Cyrus Kehr
his Attorney

Dec. 24, 1940.   A. A. SCOTT   2,226,326
MOLDING MACHINE
Original Filed Oct. 29, 1936   5 Sheets-Sheet 2
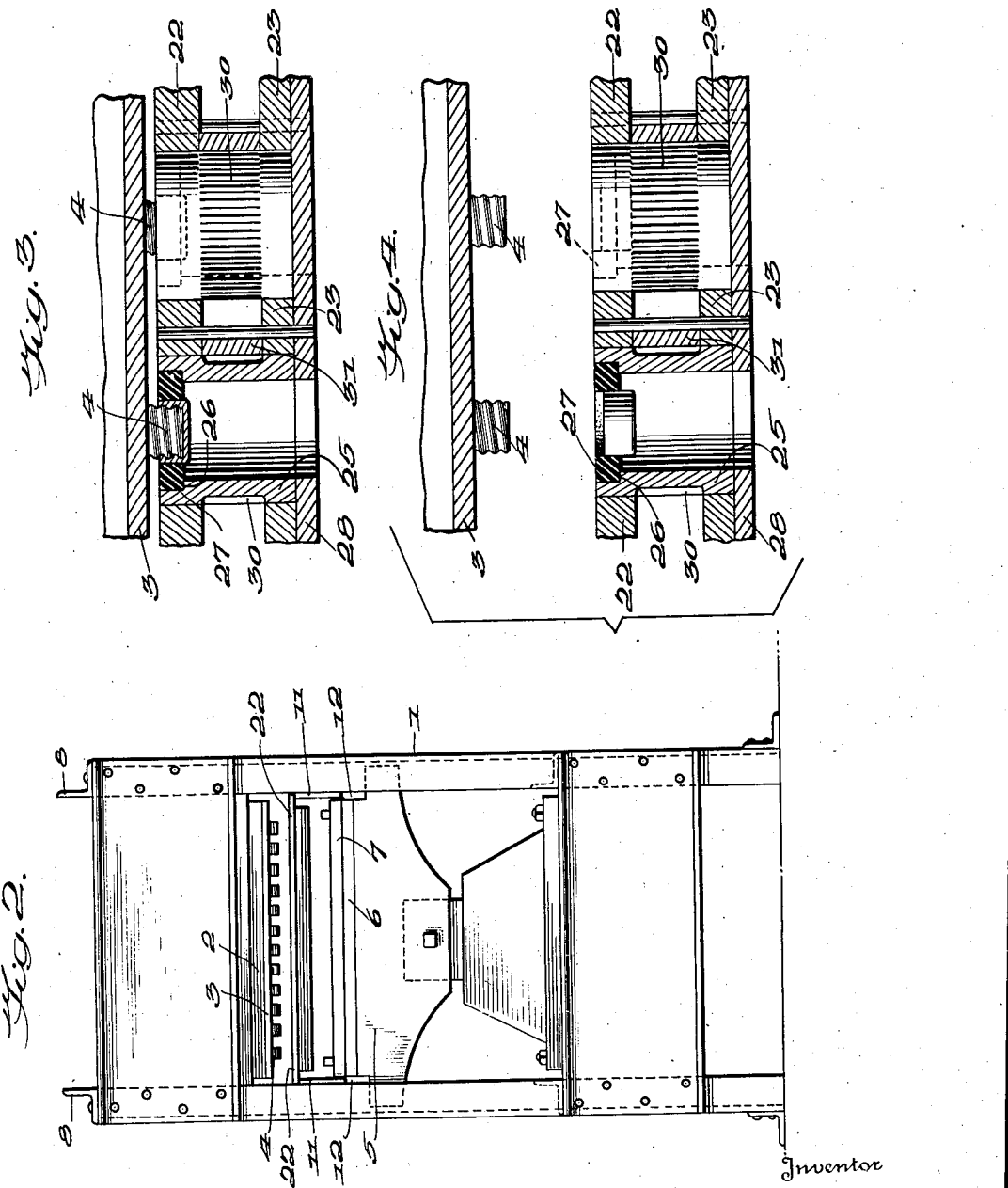
Inventor
Alexander A. Scott
By Cyrus Kehr
his Attorney

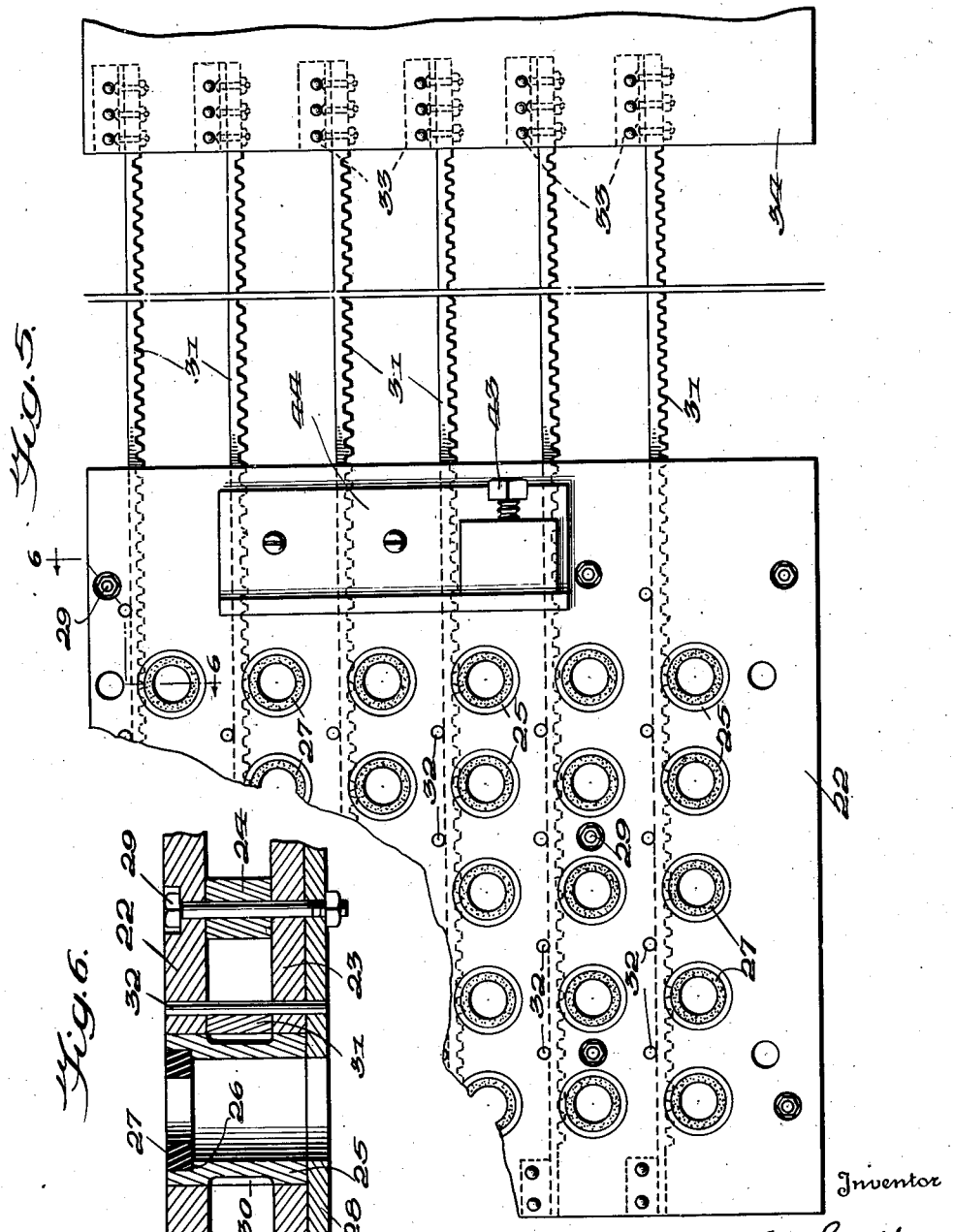

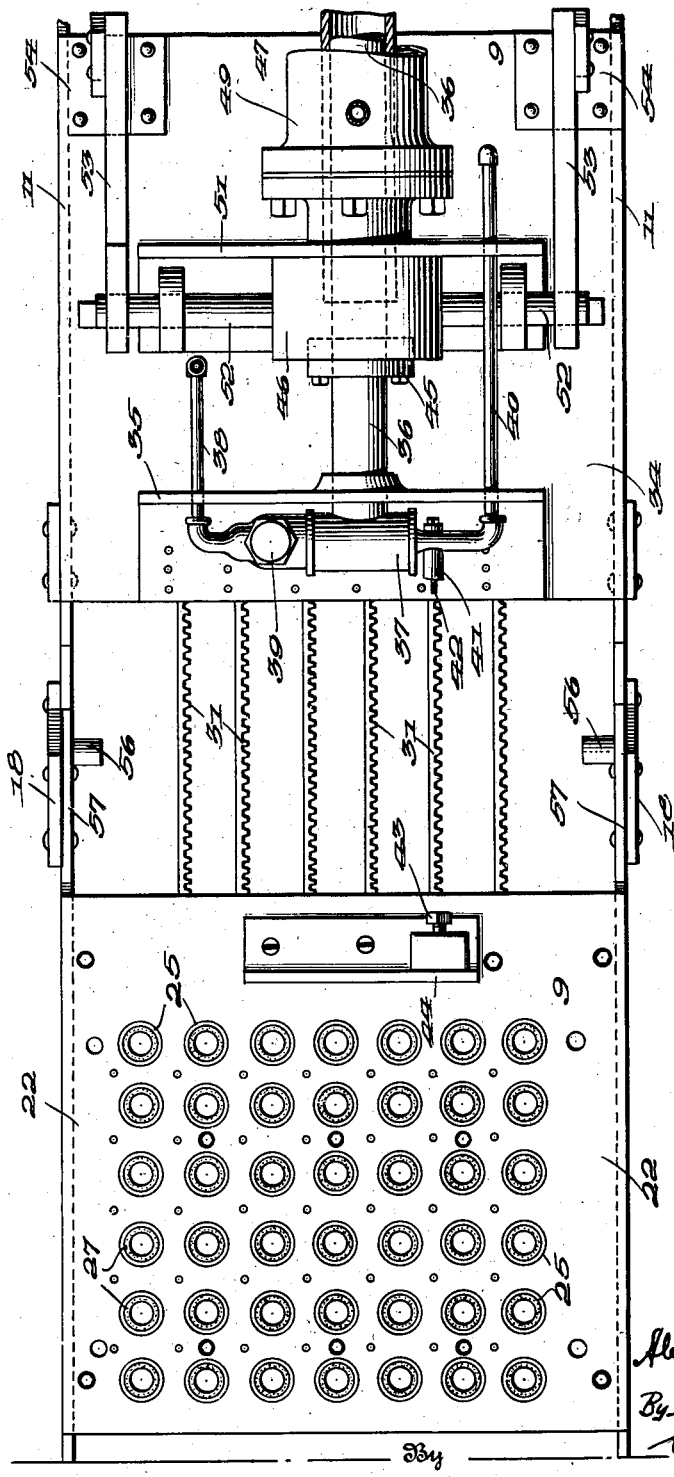

Dec. 24, 1940.    A. A. SCOTT    2,226,326
MOLDING MACHINE
Original Filed Oct. 29, 1936    5 Sheets-Sheet 5
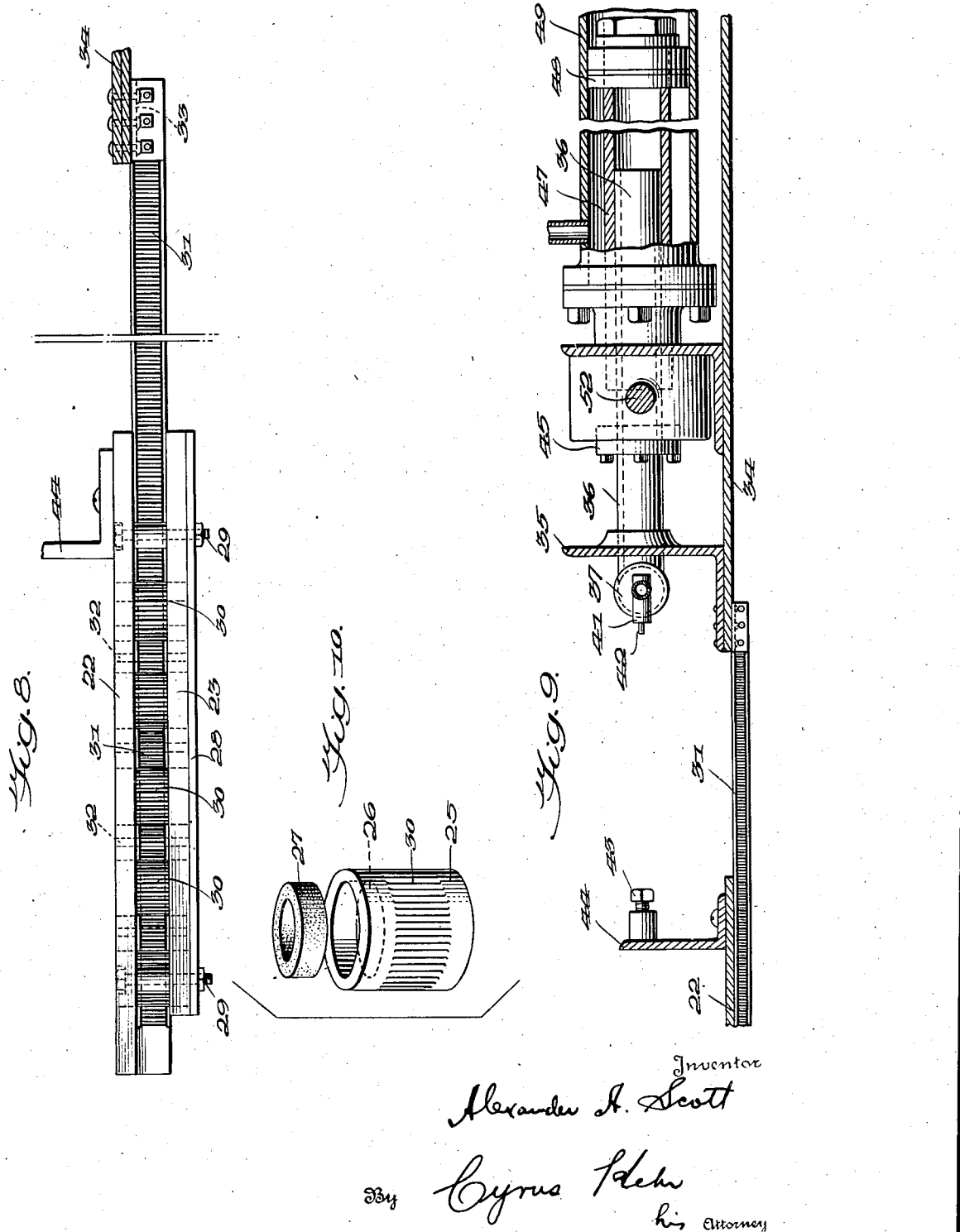

Patented Dec. 24, 1940

2,226,326

UNITED STATES PATENT OFFICE 2,226,326

MOLDING MACHINE

Alexander A. Scott, Knoxville, Tenn., assignor to Wheeling Stamping Company, Wheeling, W. Va., a corporation of West Virginia Application October 29, 1936, Serial No. 108,259
Renewed July 8, 1940

19 Claims. (Cl. 18—16)

This invention relates to an improvement in molding machines, and more particularly to such machines which are designed for molding bottle caps or other molded products which are molded with screw-threads therein, and which threads normally retain the products in one of the molds.

The object of this invention is to provide for the separation of such molded products from the molds by unitary unscrewing thereof, of a multiplicity of the products from the molds to which they are attached by the screw-threaded connections formed in the course of the molding process.

This object is accomplished by the movement of an unscrewing unit into engagement with the molded products on one of the molds after separation of the molds and then, by rotating the products, they are disconnected from the molds simultaneously so that a multiplicity of the molded products may be readily removed without the necessity for individually unscrewing these products manually, as has been necessary heretofore.

Provision is made for retaining the molded products in the unscrewing units for unitary removal thereof from between the molds to a point where they may be discharged into a suitable container for further operation or packaging. This invention preferably contemplates the employment of unscrewing heads, in the unit, one for each molded product, which heads have provision for detachable connection of the molded products therewith, and preferably the connection is flexible, so as to avoid breakage or injury to the molded products and these unscrewing heads are designed so that they may be rotated simultaneously as, for instance, by means of racks, meshing with teeth on the peripheries of the units, which racks rotate the heads for unscrewing the caps from the molds. A preferred embodiment of this invention is illustrated in the accompanying drawings, in which:

Fig. 2 is an end elevation thereof;

Fig. 3 is an enlarged vertical sectional view through the upper mold, and a portion of the unscrewing unit in position for unscrewing the molded products;

Fig. 4 is a similar view showing the unscrewing unit lowered out of operative relation with the mold;

Fig. 5 is a top plan view of a portion of the unscrewing unit;

Fig. 6 is a vertical sectional view through a portion thereof, on the line 6—6 of Fig. 5;

Fig. 7 is a top plan view of the unscrewing unit, and a portion of its operating mechanism;

Fig. 8 is a side elevation, partly in section of the unscrewing unit;

Fig. 9 is a longitudinal sectional view therethrough, substantially on the line 9—9, of Fig. 7; and Fig. 10 is a detached perspective view of the unscrewing head and its ring.

Figure 1:
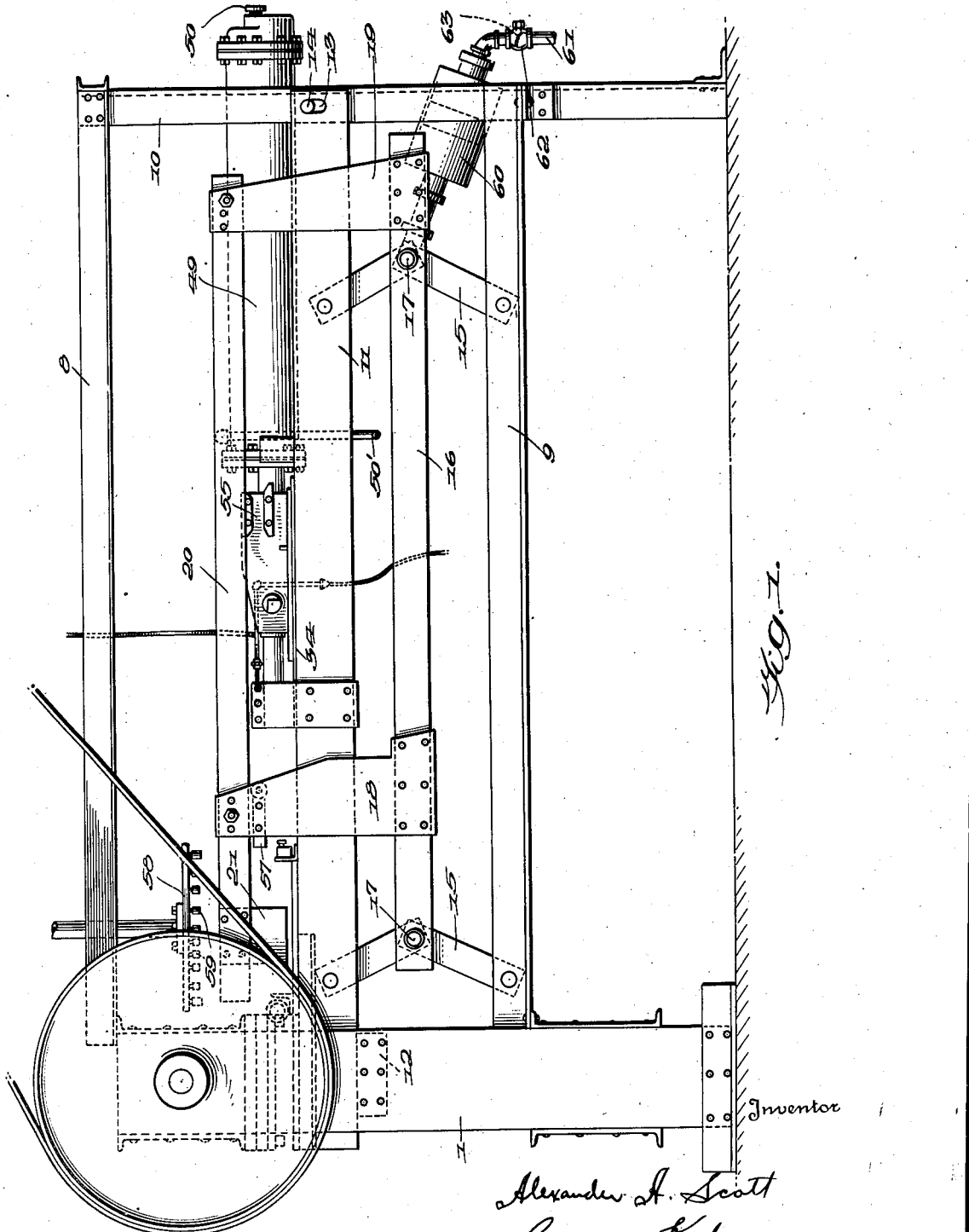
Fig. 1 is a side elevation of a molding machine, showing the invention applied thereto.

The invention is illustrated in connection with a press for molding screw caps, such as are used on bottles, jars, or the like, and which are ordinarily molded from a material which is initially plastic and granulated, and is run through a machine and pressed into small compact tablets of the desired size and weight, each tablet being designed to form one molded cap and is placed into one of the molds and pressed into the desired shape to form the screw cap, or the like.

A hydraulic press, such as is commonly used for molding such screw caps, is illustrated in Figs. 1 and 2, to show the application of the invention thereto, and is designated generally by the numeral 1. This press is shown as having the usual upper steam plate 2, carrying a mold plate 3, from which depend mold screw plugs or plunger elements 4, designed to form the threaded interior of the molded screw caps. The press is provided also with the usual head 5, designed for upward and downward movement by hydraulic means of the usual form, which need not be illustrated in detail. The head 5 carries a steam plate 6, and mold 7, which latter has cavities in the upper surface thereof, of the proper size and shape to form the external surface of the molded products, such as screw caps. Each of the screw plugs 4 and its respective cavity form a mold between the respective parts 3 and 7, for molding a product therebetween. Upon placing the molding tablets into these cavities and moving the molds together, under heat and pressure and held in such position for approximately two or three minutes usually, the material is shaped to form the screw caps and sets, so as to permit separation of the molds for removal of the caps from the screw plugs which form the upper molds. The molded screw caps are retained on the plugs by threaded connections therewith and must be unscrewed, in order to be removed therefrom. This invention has provision for unscrewing the caps from the plugs, mechanically and as a unit.

The mechanism for unscrewing the caps mechanically is supported on a frame which is mounted adjacent the press 1, and in the form illustrated, this frame comprises upper and lower side angle bars 8 and 9, each of which has one end secured to and supported upon the frame of the press, while the opposite end is secured to upright end angle bars 10, which are suitably secured together to form a rigid end frame for the main supporting frame of the unscrewing mechanism.

Extending between the press 1, and the end frame bars 10, at opposite sides of the machine are track plates 11, which are designed for vertical movement, having their downward movement limited by means of stops 12, at opposite sides of the press 1, and by slots 13 in the opposite ends of the plates 11, receiving opposite ends of a rod 14, which extends transversely of the frame and is supported by the upright bars 10.

The track plates 11 are supported by sets of toggles 15, pivotally supported by the stationary side bars 9 of the frame, and the sets of toggles on each side of the machine are joined together by a connecting bar 16, which is pivoted thereto at the joints upon rods 17, which extend transversely of the machine between the corresponding sets of toggles. Brackets 18 and 19 are carried by the connecting bars 16, and extend upwardly therefrom, supporting at their upper ends side bars 20, each of which has a depending bracket 21, in position to be engaged for movement of the toggle mechanism as will be described hereafter.

The unscrewing unit is carried by the track plates 11, as shown in Figs. 2 and 3. The unscrewing unit, in the form shown, is constructed in the form of a carriage or trolley structure, having upper and lower plates 22 and 23, held in proper relation by spacers 24, as shown in Fig. 6. The upper plate 22 is slightly longer than the lower plate 23, and slides upon the track plates 11 to support the unscrewing unit thereon. Journaled within the plates 22 and 23 are a multiplicity of rotary heads 25, each of which is cylindrical and has an internal shoulder 26, upon which is seated a resilient cushion ring 27, preferably of soft rubber, in order to snugly receive and fit on the caps, as the unscrewing unit is moved into contact therewith, while the caps are on the mold plugs 4. The heads 25 are supported on a sub-plate 28, which underlies the plate 23, and all these plates are held together by bolts 29 extending through the spacers 24. Each of the heads 25 has an external gear 30, the teeth of which mesh with rack bars 31, which extend between the upper and lower plates 22 and 23, and each of these rack bars 31 is held in proper mesh with a row of heads 25, by pins 32, which extend through the plates 22 and 23. It will be noted from Figs. 5 and 7, that the heads 25 are arranged in regular order in rows, so that a rack bar may be used to operate a row of rotary heads, in order to turn the same for unscrewing the caps which are received by the rings 27 when the unscrewing unit is moved onto the caps held by the upper molding plugs 4.

The rack bars 31 are attached by brackets 33 to the underside of a plate 34, slidably mounted upon the bracket plates 11. Mounted upon the plate 34 is an angle bracket 35, to which a hollow plunger 36 is secured, the plunger also extending into a T-fitting 37. At one side, the T-fitting 37, has a pipe 38, extending thereto from a water tank supported at a higher point for flow of water under gravity to the fitting, a check-valve 39 being provided in the pipe 38 to prevent backward flow of water through the pipe. At the opposite side, the fitting 37 has a water discharge pipe 40 connected therewith, the pipe 40 having a valve 41 therein controlled by a spring-pressed valve stem 42, which is arranged in position for operation by a screw abutment 43, carried by a bracket 44, on the plate 22 of the unscrewing unit, the screw-threaded connection of the abutment 43 permitting adjustment thereof, for properly timed operation of the valve 41.

The hollow plunger 36 extends through a packing gland 45, in a cross-head 46, which cross-head 46 has a hollow piston rod 47, secured thereto, as shown in Figs. 7 and 9, the piston rod 47 being attached to a piston 48 mounted in a cylinder 49, supported by the framework of the machine and having a fluid inlet 50, at its extreme outer end for admitting a suitable fluid, such as water into the outer end of the cylinder under pressure sufficient to move the piston 48.

The cross-head 46 is supported by an angle bracket 51, slidably mounted upon the plate 34 for movement relative to said plate. Extending laterally in opposite direction from the cross-head 46 are operating arms 52, the ends of which are angular in shape for operation of the toggle mechanism thereby, as will be described hereafter.

After the molding of the caps, as described above, the hydraulic press is opened and the molded caps are ready for removal from the screw plugs in the top mold. Water or other fluid is then admitted into the outer end of the hydraulic cylinder 49, under sufficient pressure to move the piston 48 and piston rod 47 forward, to the left in the drawings. In the meantime, water has been admitted through the pipe 38, T-fitting 37, and hollow plunger 36, into the hollow piston rod 47, substantially to fill the space therein between the piston and the plunger 36, so that upon movement of the piston 48 forward in the hydraulic cylinder 49, this motion is transmitted through the plunger 36, to move not only the cross-head 46, but also the plate 34 forward. This movement of the plate 34 transmits the motion through the rack bars 31, to the unscrewing unit, sliding the latter forward on the track plates 11 to a position between the upper and lower molds of the hydraulic press until the movement of the plates 22 and 23 is stopped, being regulated so as to position the unscrewing heads directly under the corresponding screw plugs and the caps thereon.

When movement of the plates 22 and 23 of the unscrewing unit is stopped, the cross-head 46 and rack bars 31, may continue to move so that the rack bars 31 are moved on through the unscrewing plates, during which time they revolve the empty heads 25, until the rack bars have extended or projected almost their entire lengths in their travel through the unscrewing plates. The piston rod 47 and cross-head 46 continue to move forward a sufficient distance for engagement of the arms 52 with the brackets 21 (Fig. 1), in order to straighten the toggle mechanism to raise the unscrewing unit into engagement with the caps carried by the upper mold. At this time, the valve stem 42 moves into engagement with the adjustable screw stop 43, to release the water from within the hollow plunger 36, and hollow piston rod 47, through the pipe 40 which thereby permits further movement of the cross-head 46 and arms 52 relative to the plate 34, without movement of the rack bars 31, which extended movement is for the purpose of raising the unscrewing unit into engagement with the caps. If the rack bars were operated to rotate the heads 25, during this movement, it would cause the caps to be screwed further on to the screw plugs with a tightening action which would break the caps or damage the rubber rings by friction, so that it is necessary that the heads 25 remain stationary during this connecting motion.

As the arms 52 engage the brackets 21 of the side bars 20, and move the brackets forward, such motion is transmitted to the connecting bars 16 of the toggles 15, straightening the latter and thereby raising the track bars 11, and the unscrewing unit carried thereon, pressing the rubber rings 27 over the screw caps carried on the threaded plugs 4 of the upper mold.

The unscrewing unit is now in proper position for unscrewing the caps from the screw plugs of the upper mold, which must be done by reversing the travel of the rack bars 31. The cross-head 46 and the arms 52 having moved forward in order to operate the toggles to engage the unscrewing unit with the caps, have been moved by the full forward extension of the piston rod 47, in the hydraulic cylinder 49. A latch plate 53 is carried by each arm 52, and when the latter is moved forward, the latch plate 53 drops behind a stop 54 (Fig. 7) on the plate 34.

When the rack bars 31 have been retracted about three-fourths of their lengths, the caps have been unscrewed, and then the rack bars stop momentarily while the unscrewing unit with the caps in the rubber rings 27 is lowered by the toggles when the arms 52 move back relative to the tracks 21. The retracting movement is caused by admitting water or other fluid through the pipe 49a into the inner end of the cylinder 49 and force the piston back in the cylinder.

The cross-head 46 continues to move, and a cam groove 55 in each latch plate 53 engages a pin 56, secured to bracket 18, and raises the latch plate 53, allowing the cross-head 46, to continue to move until the unscrewing unit and racks stop. The arms 52 contact bars 57, attached to the inner sides of brackets 18, positively move the side bars 20, and connecting bars 16 to lower the toggles and bracket plates 11 with the unscrewing unit thereon. The retracting movement continues until the unscrewing unit has been moved out of the hydraulic press, where it is disposed directly beneath a knock-out plate 58, having plugs 59 thereon, for pressing the screw caps out of the rubber rings 27. This knock-out plate 58 may be raised and lowered by any suitable means, such as a hydraulic hoist so as to simultaneously remove the screw caps from the unscrewing unit and enabling them to be directed to a suitable container beneath the frame work of the machine.

Attached to rod 17, of one of the toggles 15, is a hydraulic cushion 60, having a piston therein and to the outer end of the cylinder of the piston is a water pipe 61, with a check-valve 62, therein. When the toggle 15 is straightened, the piston is drawn forward in the slide which draws water into the outer end of the cylinder through the check-valve, but upon closing of the check-valve the water is trapped in the outer end of the slide and is discharged only through a relatively small opening 63, in the check-valve which allows a slow discharge from the cylinder which allows only a slow downward movement of the bracket plate and the unscrewing unit carried thereby.

I claim:

1. A method of removing screw-threaded molded products from a plurality of molds mounted in a press and each comprising superimposed separable parts, with one of which mold parts its respective product has screw-threaded connection, comprising moving a unit comprising a plurality of rotatable unscrewing devices between said mold parts after they have been separated and while in the press into engagement with the products, and unscrewing a plurality of said products from their respective mold parts by rotary movement of said devices between said separated mold parts.

2. In a method of molding products between molds separable to provide a space therebetween, with one of which the products are retained after molding, the step of removing said products comprising moving a unit comprising a plurality of unscrewing heads between separated molds, moving said heads into engagement with the products, rotating the heads to remove the products from one of the molds, retaining the products in the heads and simultaneously removing them from between the molds.

3. In a machine of the character described, the combination of a unit having a plurality of rotary heads mounted therein, each of the heads having means for engaging a molded product screw-threaded on a mold, and means for simultaneously rotating a plurality of said heads for unscrewing the products from the molds.

4. In a machine of the character described, the combination of a unit having a plurality of rotary heads mounted therein, each of said heads having means for engaging a molded product screw-threaded on a mold, and having a gear thereon, rack bars slidably mounted in the unit and meshing with the gears of the plurality of rotary heads to rotate the same and unscrew the products from the molds.

5. In a machine of the character described, the combination of a unit having a plurality of rotary heads mounted therein, each of said heads having means for engaging a molded product screw-threaded on a mold, and having a gear thereon, rack bars slidably mounted in the unit and meshing with the gears of a plurality of rotary heads to rotate the same and unscrew the products from the molds, and means for simultaneously moving a plurality of said rack bars longitudinally relative to the unit.

6. In a machine of the character described, the combination of a unit having a plurality of rotary heads mounted therein, each of said heads having means for engaging a molded product screw-threaded on a mold, and having a gear thereon, rack bars slidably mounted in the unit and meshing with the gears of a plurality of rotary heads to rotate the same and unscrew the products from the molds, and plunger operated means operatively connected with the rack bars for moving the same longitudinally relative to the unit.

7. In a machine of the character described, the combination of an approximately cylindrical unscrewing head for removing a molded product from a mold part with which it has screw-threaded connection, and having a resilient engaging ring for receiving the molded product therein, said ring having its periphery secured to the cylindrical head and projecting inwardly appreciably from the inner wall thereof and being sufficiently resilient to yield axially of the head while holding the product therein, means for turning said head to unscrew the product attached to the mold, and means for holding the head against bodily endwise movement during unscrewing of the product.

8. In a molding machine of the character described, the combination of separable molds for molding products therebetween with screw-threaded connections between said products and a mold, means for unscrewing the products from the molds, and means for moving the unscrewing means into the space between said molds after separation for engaging the products to remove the same.

9. In a press of the character described, the combination of separable molding heads for molding products therebetween, guides for one of said heads for movement thereof relative to the other head, one of said heads having means for screw-threaded connection between the molded products and said head, means for unscrewing the products from the head, and means for moving the unscrewing means into the space between said molding heads intermediate the guides after separation of the heads for engaging the products to remove the same.

10. In a molding machine of the character described, the combination of separable molds for molding products therebetween of the character wherein the molded products have a screw-threaded engagement with one of the molds, means for unscrewing the products from the molds, and means for moving the unscrewing means into the space between said molds after separation for engaging the products to remove the same.

11. In a press of the character described, the combination of separable molding heads for molding products therebetween, guides for one of said heads for movement thereof relative to the other head, one of said heads having means for screw-threaded connection between the molded products and said head, means for unscrewing the products from the head, and means for moving the unscrewing means into the space between said molding heads intermediate the guides after separation of the heads for engaging the products to remove the same and for movement out of the space intermediate the guides to a point wholly externally of the press.

12. In a press of the character described, the combination of separable mold parts for molding products therebetween, one of said mold parts having pins constructed to mold products therearound with screw-threaded connections therewith, a support carrying a plurality of rotary heads having means for engaging said molded products to unscrew the same from the pins, means for moving said support and heads into the space between said mold parts after separation for engaging the products, and means for rotating the heads relative to the pins to unscrew the products therefrom.

13. In a molding machine of the character described, the combination of separate upper and lower molds for molding products therebetween, an unscrewing unit having means for engaging and removing the products from one of the molds, means for moving said unit between the molds when said molds are separated and into contact with the products on one of the molds, and means for operating said unit to remove the products from the mold for removal with the unit.

14. In a machine of the character described, the combination of mold parts constructed for molding products with screw-threaded connections between the products and one of the mold parts, of a plurality of rotary heads having means for engaging the molded products on the mold part, and means geared with a plurality of said heads for rotating the same.

15. In a machine of the character described, the combination of mold parts constructed for molding products with screw-threaded connections between the products and one of the mold parts, a unit having a plurality of rotary heads journaled therein, said heads having means for engaging the molded products on the mold part, and rack means geared with a plurality of said heads for rotating the same simultaneously.

16. In a machine of the character described, the combination of mold parts constructed for molding products with screw-threaded connections between the products and one of the mold parts, a unit having a plurality of rotary heads journaled therein, said heads having means for engaging the molded products on the mold part, rack means geared with a plurality of said heads for rotating the same simultaneously, and means for holding the heads against bodily endwise movement in the unit during rotation thereof.

17. Apparatus for molding articles, comprising a press having mold means thereon shaped to form a plurality of articles having screw-threaded engagement with said mold means, a stripping means mounted on the press having a driven member thereon for frictionally engaging the formed articles to unscrew them from the mold means, one of said means being movable with respect to the other to present the mold means to the stripping means, and means for moving said movable means on said press.

18. Article-molding apparatus comprising a press having upper and lower mold members movable vertically relatively to each other, one of said mold members having a number of plunger elements projecting thereof, a supporting means on the press, a carriage on the supporting means movable in a horizontal plane along the supporting means between the said upper and lower mold members, whereby it may be positioned adjacent the several plunger elements, means independent of the movement of the mold members for raising and lowering the carriage, and stripping means on the carriage which is moved by the raising and lowering movement of the carriage into and out of cooperating position with the plunger elements adjacent to which the carriage is positioned.

19. The combination with a press for forming plastic articles having a multiple mold with mold units arranged in parallel rows thereon and having a second mold for cooperation with the first and of a character wherein the articles when formed are in screw-threaded engagement with one of the molds, of a supporting frame mounted on the press, a trolley structure mounted on the supporting frame and movable therealong, said supporting frame and trolley being so arranged that the trolley may move back and forth between said molds across the surface of the molds and to a position to one side of the molds.

ALEXANDER A. SCOTT.